May 20, 1924.
I. C. WOODWARD
1,494,457
DIFFERENTIAL GEAR CONTROL MECHANISM
Filed March 10, 1924
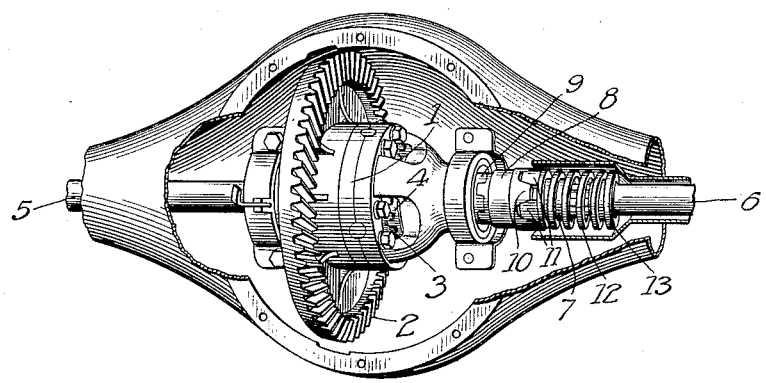
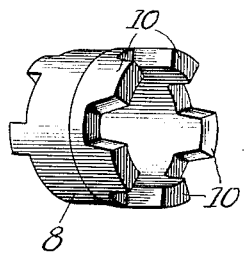
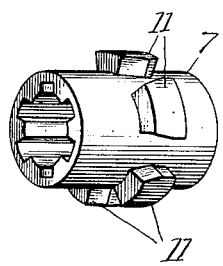
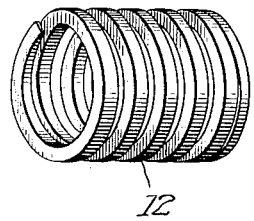
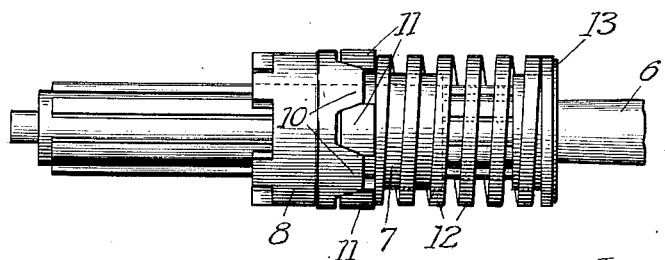
Witness
Martin H. Olsen.
Inventor
Irving C. Woodward
By Rummler & Rummler
Atty.

Patented May 20, 1924.

1,494,457

UNITED STATES PATENT OFFICE.

IRVING C. WOODWARD, OF SYRACUSE, NEW YORK.

DIFFERENTIAL-GEAR CONTROL MECHANISM.

Application filed March 10, 1924. Serial No. 698,035.

*To all whom it may concern:*

Be it known that I, IRVING C. WOODWARD, a citizen of the United States of America, and a resident of Syracuse, in the county of Onondaga and State of New York, have invented a new and useful Improvement in Differential-Gear Control Mechanism, of which the following is a specification.

This invention relates to improvements in control mechanisms for differential gears forming part of vehicle drive mechanisms, and is of the same general type as that described in applicant's Patent No. 1,355,297, of October 12, 1920, and in a copending application for Patent No. 693,200, filed Feb. 16, 1924.

The purpose of the present invention is to provide a simple form of control mechanism for the differential gearing, this control mechanism operating automatically to restrain the differential gearing from driving the two axles at different speeds. When there is an excessive difference in resistance to rotation of the two driven axles, the control mechanism will momentarily operate to permit differential action.

In the construction shown in the drawings, Figure 1 represents a perspective view of a standard differential gearing shown within a housing partly broken away and provided with the improved control parts.

Figures 2, 3 and 4 are perspective views of different parts of the control mechanism.

Figure 5 is a view showing the control mechanism assembled on one of the driven axles.

The standard form of differential gear is not altered by the application thereto of the control mechanism, except by lengthening the hub on one side of the planetary gear casing. This lengthened portion of the hub is provided with teeth for permanently engaging a toothed collar telescoping over one end of a sleeve slidable along the splines on the driven axle. This sleeve always rotates with the axle, and extending radially from the central part of its surface are teeth having inclined sides or warped surfaces for coacting with similarly inclined teeth on the outer end of the extension collar fitted to the planetary gear casing hub. The splined sleeve is normally urged into engaging position by a coiled spring bearing between the teeth on the sleeve and a fixed abutment on the driven axle.

In the operation of the gearing, the two driven axles receive motion as usual from intermediate planetary pinions meshing on opposite sides with gears respectively splined to the driven axles. One of the driven axles is also connected through the control mechanism with the differential gear casing and is, therefore, ordinarily compelled to rotate at the same speed as the casing. Since the intermediate pinions are also carried by the casing, the opposite axle is restrained from rotating at other speeds than the speed of the casing. When the resistance to rotation of the two driven axles becomes great enough, the clutching elements of the controlling mechanism cam apart against the action of the spring, and, therefore, the two driven axles may to a limited extent, rotate at different speeds. When one axle encounters but small tractive resistance to rotation, it cannot race because the control mechanism then offers the required resistance against excessive differences in speed between the two driven axles.

The control mechanism makes the differential gear drive comparatively safe under bad road conditions by preventing excessive differences in tractive action of the driven wheels, and by maintaining more uniform conditions for the braking action on opposite sides of the vehicle.

Referring to the drawings, the differential gear casing is shown as carrying the usual ring gear 2 and the planetary pinions 3, which mesh on opposite sides with gears 4, splined to the driven axles 5 and 6. The splines of one of these axles extend further along the axle than usual so as to slidably receive a toothed sleeve 7. Telescoping over one end of the sleeve 7 is a collar 8 virtually forming an extension of the hub 9 of the differential gear casing, since this collar is in toothed engagement with the hub 9. At its opposite end the sleeve 8 is provided with teeth 10 interfitting with similar teeth 11 extending radially from the central part of tube 7. The teeth 10 and 11 are shaped on their sides to correspond with a warped surface so that surface engagement over the entire area of contact between the teeth is maintained as these teeth move into and out of mesh. A comparatively strong helical spring 12 bears between the outer sides of teeth 11 and a member 13 fitted fast to the axles.

In the operation of the control mechanism, when one of the driven axles is substantially free to rotate, because the tractive effort thereon is light due to slippery road conditions, while the other axle is compelled to transmit most of the power because of better traction on that side, the two axles will nevertheless rotate at substantially the same speed up to the point where the resistance encountered by one axle because of load or traction becomes great enough to endanger some part of the mechanism. The control clutch will then give, due to the sleeve 7 being forced outwardly along the axle by the camming action between the inclined teeth 10 and 11. A difference in speed of rotation between the two driven axles likewise may occur when the vehicle is making a turn, under which conditions the inner wheel is restrained from rotating at the speed of the differential casing or ring gear, while the outer wheel is accelerated so as to exceed the speed of the ring gear. When these opposite torques become of sufficient value, the control clutch will momentarily release the gearing for differential motion, again restraining it against differential motion as soon as the opposed torques become more nearly alike.

I claim:

1. In a control mechanism of the class described, the combination of a differential gearing and a pair of shafts driven thereby, a casing for said differential gearing having a journal surrounding one of said driven shafts, a hollow toothed member rotatable with said journal, a sleeve mounted for rotation with said driven shaft and for sliding motion on the shaft, one end of said sleeve extending into said hollow toothed element, radially extending teeth on said sleeve for engaging teeth of said hollow toothed element, and a spring for resiliently retaining the teeth of the sleeve in engagement with the teeth of said hollow element.

2. In a control mechanism of the class described, the combination of a differential gearing and a pair of shafts driven thereby, a casing for said differential gearing having a journal surrounding one of said driven shafts, a hollow toothed member rotatable with said journal, a sleeve mounted for rotation with said driven shaft and for sliding motion on the shaft, one end of said sleeve extending into said hollow toothed element, radially extending teeth on said sleeve for engaging teeth of said hollow toothed element, and a spring for resiliently retaining the teeth of the sleeve in engagement with the teeth of said hollow element, and the teeth on said sleeve being located substantially midway of its length.

3. In a control mechanism of the class described, the combination of a differential gearing and a pair of shafts driven thereby, a casing for said differential gearing having a journal surrounding one of said driven shafts, a hollow toothed member rotatable with said journal, a sleeve mounted for rotation with said driven shaft and for sliding motion on the shaft, one end of said sleeve extending into said hollow toothed element, radially extending teeth on said sleeve for engaging teeth of said hollow toothed element, and a spring for resiliently retaining the teeth of the sleeve in engagement with the teeth of said hollow element, the coacting teeth on said hollow element and said sleeve being provided with sides cut to warped surface form.

4. A control mechanism for differential gears of vehicle drive mechanisms, comprising a driven shaft provided with splines at one end, a sleeve having coacting splines slidable along said shaft, said sleeve being provided with centrally located radially extending teeth, a collar fitting over one end of said sleeve provided with teeth at its end for coacting with the teeth on said sleeve, a spring retainer on said shaft, and coiled spring located between said retainer and said sleeve.

Signed at Syracuse this sixth day of March, 1924.

IRVING C. WOODWARD.